July 5, 1955 — D. A. HAYNES — 2,712,295
ALARM FOR COOKING VESSEL
Filed Feb. 17, 1954 — 2 Sheets-Sheet 1

INVENTOR.
Don A. Haynes
BY
Richard A. Parsons

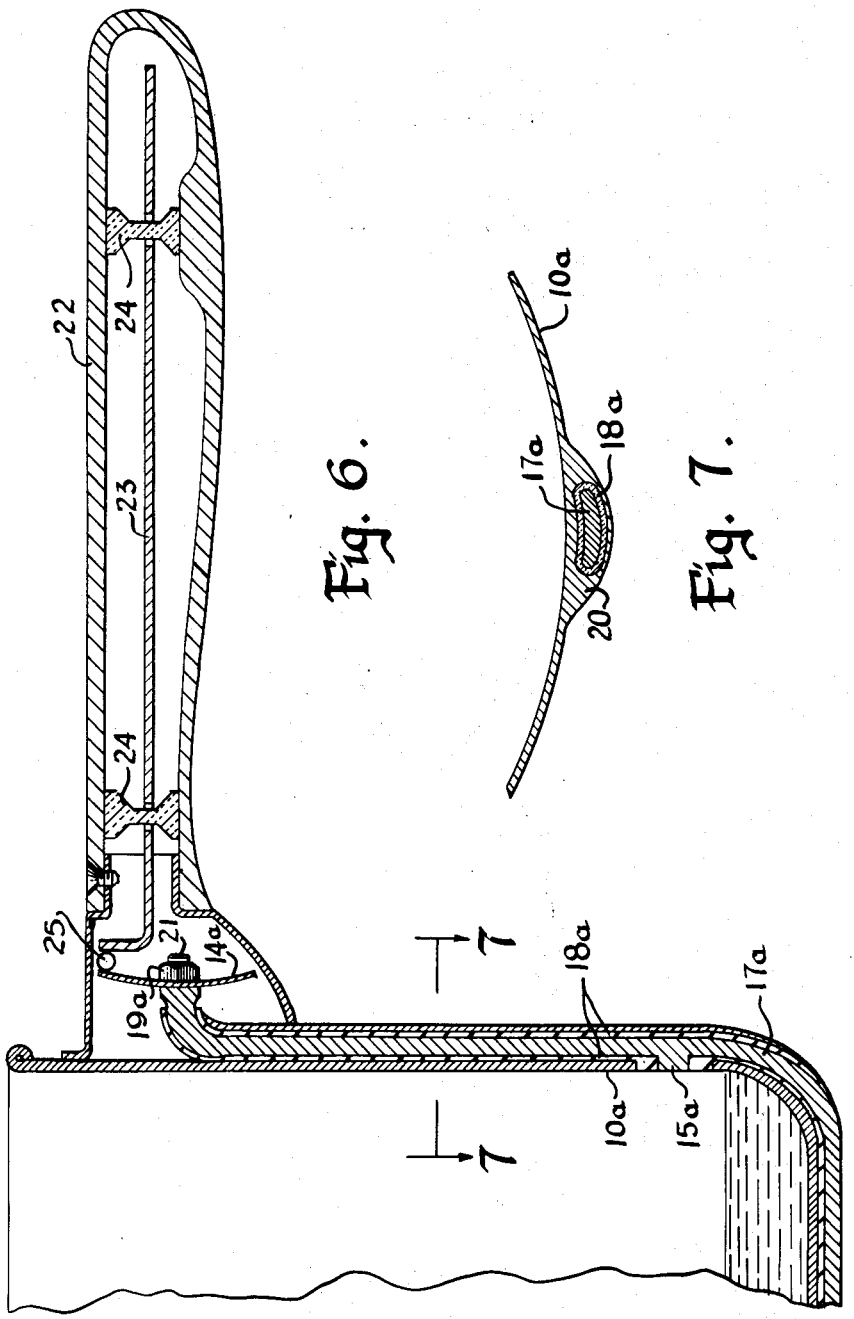

United States Patent Office 2,712,295
Patented July 5, 1955

2,712,295

ALARM FOR COOKING VESSEL

Don A. Haynes, Meridian Township, Ingham County, Mich.

Application February 17, 1954, Serial No. 410,836

6 Claims. (Cl. 116—109)

This invention relates to cooking vessels, and more particularly to alarms therefor, for indicating near exhaustion of liquid therein.

The principal object of the present invention is to provide a simple and positive alarm for indicating the near exhaustion of liquid in a cooking vessel whereby to prevent scorching of goods therein and prevent damage to the vessel.

Another object is to provide an audible alarm for the same purpose.

These objects will more fully appear in the following specification when read in connection with the accompanying drawings, wherein:

Figure 6 is a fragmentary cross-sectional view of a saucepan having as a part thereof a further modified form of the invention; and Figure 7 is a fragmentary cross-sectional view taken on substantially the line 7—7 of Figure 6.

Figure 1:
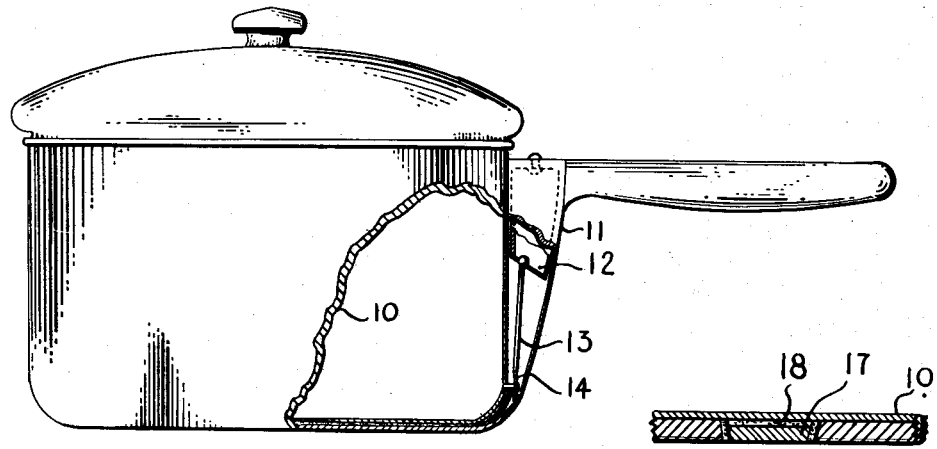
Figure 1 is a side view of a saucepan equipped with the invention, parts being broken away to more clearly disclose the invention.
Figure 2:
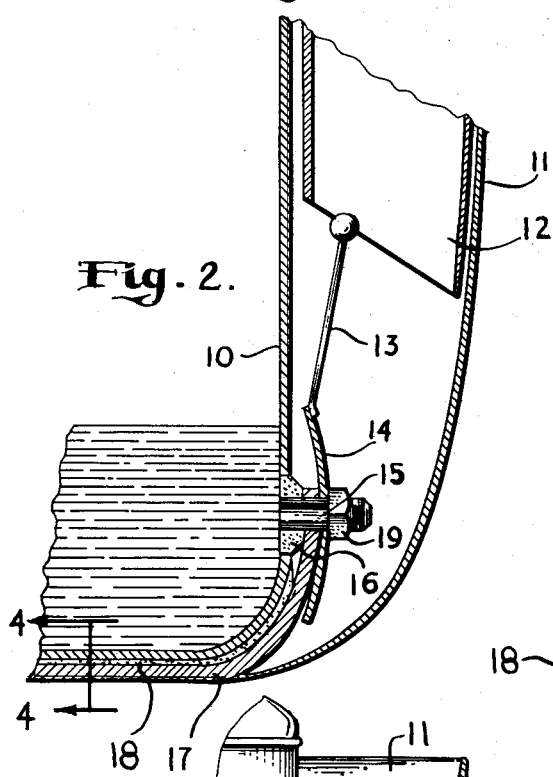
Figure 2 is a fragmentary vertical cross-sectional view of the same on an enlarged scale.

Figure 1 illustrates a saucepan 10 having a handle 11 thereon. The handle is provided with a depending shield which may or may not be formed as an integral part thereof. The purpose of the shield will appear presently. Within the shield 11 is a gong 12 spaced on its sides from the shield. A striker 13 is mounted on the rim of a circular bimetal disk 14. This disk is of a concave section toward the pan when at normal temperatures, as shown in Figure 2. When heated to a predetermined temperature the disk snaps to a convex section, causing the striker to hit the gong 12 and create an audible sound. These bimetal disks can be obtained from manufacturers of the same. They can be had in a variety of combinations of metal. Thus, a suitable disk can be obtained that will snap at the temperature desired.

The disk 14 is centrally apertured and is mounted on a stud 15 threaded at its outer end. The inner end is located within a ring of heat insulation 16 inserted in an aperture in the wall of the pan. The joints between the wall of the pan and insulator, and between the insulator and the stud, should be water tight.

The stud 15 is located near the bottom of the pan. It should be at a point below which the liquid level should not descend appreciably before the alarm sounds.

Figure 4:
Figure 4 is a fragmentary cross-sectional view taken on the line 4—4 of Figure 2.

The bottom of the pan is preferably provided with a groove exteriorly thereof to receive a heat conductive bar 17. See Figures 2, 3 and 4. This bar is insulated from the pan by suitable heat insulation 18. The bar 17 extends across or partially across the bottom of the pan and the lower surface thereof should be flush with the bottom of the pan so it will be in direct heat transfer relation with the burner on which the pan is placed.

The outer end of the bar 17 is turned up inside the shield 11 and connected to stud 15. The bar 17 and bimetal disk 14 are fastened to the stud 15 by a nut 19.

A bimetal disk 14 should be chosen that will snap at temperature above the boiling point of water.

In operation the vessel is filled with the proper amount of water and food in the usual manner. The liquid level should be above the stud 15, however. The pan is placed on a range burner and cooking proceeds as usual. During the cooking process heat is transmitted from the heat source to the stud 15 of a conductive bar 17. This heat, while it affects the bimetal element 14 to some extent, is largely drained away through the stud 15 to the liquid. The liquid will not rise appreciably above 212° F. and consequently the stud and bimetal disk will be kept relatively cool.

Figure 3:
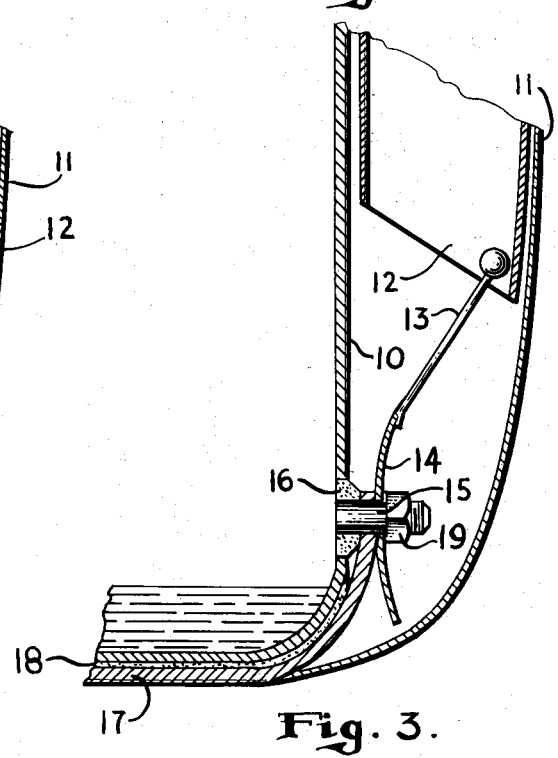
Figure 3 is a view similar to Figure 2 showing the alarm activated.

When the liquid level drops somewhat below the stud, as shown in Figure 3, the heat from the bar 17 will not be carried away by the stud, because water vapor is not an efficient coolant. Consequently, the stud and bimetal disk temperatures will rise to the point where the disk will snap to the position shown in Figure 3 causing the striker to hit the gong, thereby warning the user to remove the vessel from the source of heat, or add more liquid.

As soon as the temperature of the bimetal disk drops sufficiently it snaps back to the position shown in Figure 2 ready for use again.

The shield 11 covers the disk 14 and stud protecting them from direct heat from the source so that the alarm will not sound prematurely.

Figure 5:
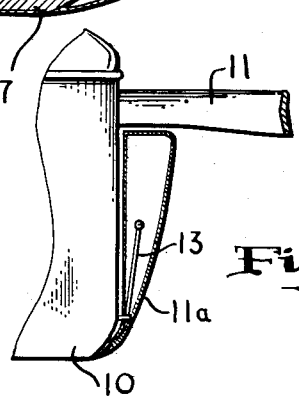
Figure 5 is a fragmentary side view of a slightly modified form of the invention.

In the form of the invention shown in Figure 5 all parts are the same except the shield. In this form the edges of the shield 11a are spaced slightly from the side of the pan, and the shield itself is used as the gong.

The form of the invention shown in Figures 6 and 7 differs from that shown in Figures 1 to 4 in that the bimetal disk is located much farther from the heat source.

In this form a sauce pan 10a is provided with a heat conductive bar 17a insulated from the pan by insulation 18a. The bar 18a is provided with a stud 15a extending through the wall of the pan. In this form the stud 15a is integral with the bar 17a.

Preferably the bar 17a and insulating material are completely enclosed within a rib 20 forming an integral part of the pan wall, although it is not essential that the bar and insulation be enclosed. The bar and its insulation is continued up the side wall of the pan to a point near its upper edge, where it turns and terminates in a threaded stud 21.

A bimetal disk 14a is fastened on said stud by a nut 19a. The disk is of the same character as disk 19 and operates in a similar manner.

A hollow handle 22 carries within it a strip of steel 23 or other metallic material which acts as a gong. The gong 23 is loosely mounted on fiber or hard rubber grommets 24 so that it can vibrate freely.

The disk 14a is provided at its edge with a striker 25 which, when the disk snaps due to increase in heat, strikes gong 23 and produces an audible sound.

The operation of this form of the invention is essentially the same as that in Figures 1 to 4. Heat travelling up bar 17a actuates bimetal disk 14a and strikes the gong.

From the foregoing it will be seen that the present invention provides a simple, accurate alarm for indicating near exhaustion of liquid in a cooking vessel. It is positive in operation and will not easily get out of order.

The scope of the invention is indicated in the appended claims.

I claim:

1. A cooking vessel having an alarm for indicating the near exhaustion of liquid therein, said vessel having a bottom and side walls, said alarm comprising a heat conductor extending through a side wall of said vessel and extending beneath said vessel adjacent to the bottom wall thereof, said conductor being insulated in its entirety from said vessel but in a position to be exposed to the source of cooking heat, a movable snap action thermostatic element connected to said conductor adjacent the point where the latter passes through the wall of the vessel, and means actuated by movement of said element upon a predetermined increase in the temperature thereof for producing an alarm.

2. A cooking vessel of the character set forth in claim 1 wherein a shield is attached to the vessel and surrounds the thermostatic element to shield the element from direct heat from the source.

3. A cooking vessel of the character set forth in claim 1 wherein the bottom of the vessel is provided with a groove and the heat conductor is located therein.

4. A cooking vessel of the character set forth in claim 1 wherein the heat conductor extends through the vessel wall adjacent the bottom thereof.

5. A cooking vessel of the character defined in claim 1 wherein the thermostatic element is a bimetal disk connected centrally to the heat conductor and carries a striker at the outer edge, and a gong mounted on the vessel adjacent the striker.

6. A cooking vessel having an alarm for indicating the near exhaustion of liquid in said vessel comprising a heat conductor extending through a wall of said vessel and extending beneath said vessel adjacent to the bottom thereof, said conductor being insulated in its entirety from said vessel but in a position to be exposed to the source of cooking heat, a thermostatic element connected to said conductor adjacent the point where the latter passes through the wall of the vessel, and means actuated by movement of said element upon a predetermined increase in the temperature thereof for producing an alarm.

References Cited in the file of this patent

UNITED STATES PATENTS

| 114,216 | Stanton | Apr. 25, 1871 |
| 1,318,308 | Allis | Oct. 7, 1919 |
| 1,692,153 | Botts | Nov. 20, 1928 |
| 2,422,974 | Newell | June 24, 1947 |

FOREIGN PATENTS

| 757 | Great Britain | of 1903 |
| 71,171 | Norway | Jan. 12, 1945 |